United States Patent [19]
Obrejanu

[11] Patent Number: 5,902,378
[45] Date of Patent: May 11, 1999

[54] CONTINUOUS FLOW DOWNHOLE GAS SEPARATOR FOR PROCESSING CAVITY PUMPS

[76] Inventor: Marcel Obrejanu, 248 Riverbend Drive South East, Calgary, Alberta, Canada, T2C 3X8

[21] Appl. No.: 08/909,975

[22] Filed: Aug. 12, 1997

[30] Foreign Application Priority Data

Jul. 16, 1997 [CA] Canada ................................ 2270770

[51] Int. Cl.⁶ .................................................. B01D 19/00
[52] U.S. Cl. ................................ 95/248; 55/319; 55/457; 95/261; 96/195; 96/204; 96/211; 96/216
[58] Field of Search ........................ 95/248, 260, 261, 95/269; 96/195, 204, 207, 208, 209, 210, 211, 215, 216, 217; 55/319, 456, 457

[56] References Cited

U.S. PATENT DOCUMENTS

| | | | |
|---|---|---|---|
| 2,446,882 | 8/1948 | Morrison | 55/457 |
| 2,674,192 | 4/1954 | Coberly | 96/211 |
| 2,970,669 | 2/1961 | Bergson | 55/456 |
| 3,128,719 | 4/1964 | Jongbloed et al. | 55/456 |
| 3,204,696 | 9/1965 | Priester et al. | 55/456 |
| 4,272,258 | 6/1981 | Shifflett | 55/456 |
| 4,367,676 | 3/1983 | Gill | 96/216 |
| 5,338,341 | 8/1994 | Mazzei et al. | 96/208 |
| 5,531,811 | 7/1996 | Kloberdanz et al. | 96/208 |
| 5,570,744 | 11/1996 | Weingarten et al. | 55/457 |
| 5,698,014 | 12/1997 | Cadle et al. | 96/216 |

FOREIGN PATENT DOCUMENTS

| | | | |
|---|---|---|---|
| 79/00350 | 6/1979 | WIPO | 96/216 |

OTHER PUBLICATIONS

Development and Testing of a Compact Liquid–Gas Auger Partial Separator for Downhole or Surface Applications— pp. 34 to 40; J.S. Weingarten, M.M. Kolpak, S.A. Mattison and M.J. Williamson; SPE Production & Facilities, Feb. 1997.

*Primary Examiner*—Duane S. Smith
*Attorney, Agent, or Firm*—Merchant, Gould, Smith, Edell, Welter & Schmidt

[57] ABSTRACT

The efficiency of progressing cavity pumps is drastically reduced if the liquid being pumped contains large volumes of gas. To alleviate this problem a gas separator is provided which can be attached to the suction of a downhole pump to remove gas from the liquid being pumped prior to the liquid entering the pump inlet. The separator has an elongate housing having an annular chamber with guides which direct the liquid gas mixture to flow in an annular path from the inlet to the outlet end. During this flow centrifugal forces act to displace the gas content to the central region from which it is removed via a separate central gas outlet so that liquid delivered to the pump inlet is greatly reduced in its gas content.

17 Claims, 5 Drawing Sheets

5,902,378

CONTINUOUS FLOW DOWNHOLE GAS SEPARATOR FOR PROCESSING CAVITY PUMPS

BACKGROUND OF THE INVENTION a) Field of the Invention

This invention relates to a new or improved arrangement for separating gas from liquids, and in particular relates to a new or improved gas separator. The gas separator disclosed herein is particularly although not exclusively intended for use with a downhole progressing cavity pump for removing gas from liquids extracted from subsurface formations, prior to the liquid entering the pump suction.

b) Description of the Prior Art

Progressing cavity pumps are volumetric type pumps so that the efficiency of the pump is reduced by whatever percentage of the pump volume is occupied by gas. Furthermore the stator of such a pump will usually have an elastomer covering and such elastomers can be damaged by gases such as carbon dioxide and hydrogen sulphide which are typically encountered in oil well bores. Progressing cavity pumps also rely for their lubrication and cooling on the liquid that is being pumped. If this liquid contains too high a content of gas, then the pump will not be properly lubricated and cooled. Where lubrication and/or cooling are insufficient, then the pump stator may experience accelerated wear, and furthermore the heat generated by friction between the rotor and the stator can cause the stator to be "cooked" or "burned" resulting in premature failure of the stator and the pump.

SUMMARY OF THE INVENTION

The present invention provides a method for separating gas from a liquid/gas mixture produced from a sub-surface formation in a well bore, said method comprising: drawing a flow of said mixture from said formation and advancing said flow in an annular path with sufficient angular momentum to effect at least partial separation of said flow into a central liquid-depleted gaseous portion and a peripheral gas-depleted liquid portion; and drawing off said liquid portion.

The invention from another aspect provides apparatus for separating liquid from a liquid-gas mixture drawn from a sub-surface formation in a well bore, said apparatus comprising:

a housing that defines therein an elongate annular separation chamber; an inlet in said housing to admit said liquid-gas mixture to said chamber; guides in said chamber to constrain said liquid-gas mixture entering said chamber to flow in an annular path along said chamber to an exit end whereby centrifugal forces created by said flow act to separate said mixture into a gas-depleted outer portion and a liquid-depleted central portion; and separate liquid and gas outlet ports at said exit end to receive said gas-depleted and liquid-depleted portions respectively.

To enhance separation of gas from the liquid, at the downstream end of the guides the flow is delivered into an enlarged expansion chamber. The flow entering the expansion chamber undergoes a substantial pressure reduction which enhances separation of gas from the liquid, the gas being confined to the central axial region of the expansion chamber by the angular momentum of the liquid flow.

Preferably the guides define a helical annular flow path, the housing comprising a hollow cylindrical member having a coaxial auger positioned therein, the auger having a central axial spindle surrounded by guides in the form of helical flights. The spindle terminates at an axial spacing from the outlet ports, the outlet port for gas being positioned at a central location in the outlet port for liquid being at a peripheral location. The separator is preferably used in combination with an axially aligned progressing cavity pump, gas depleted liquid from the separator liquid outlet being delivered to the pump inlet.

BRIEF DESCRIPTION OF THE DRAWINGS

The invention will further be described, by way of example only, with reference to the accompanying drawings wherein.

DESCRIPTION OF THE PREFERRED EMBODIMENTS

Figure 1:
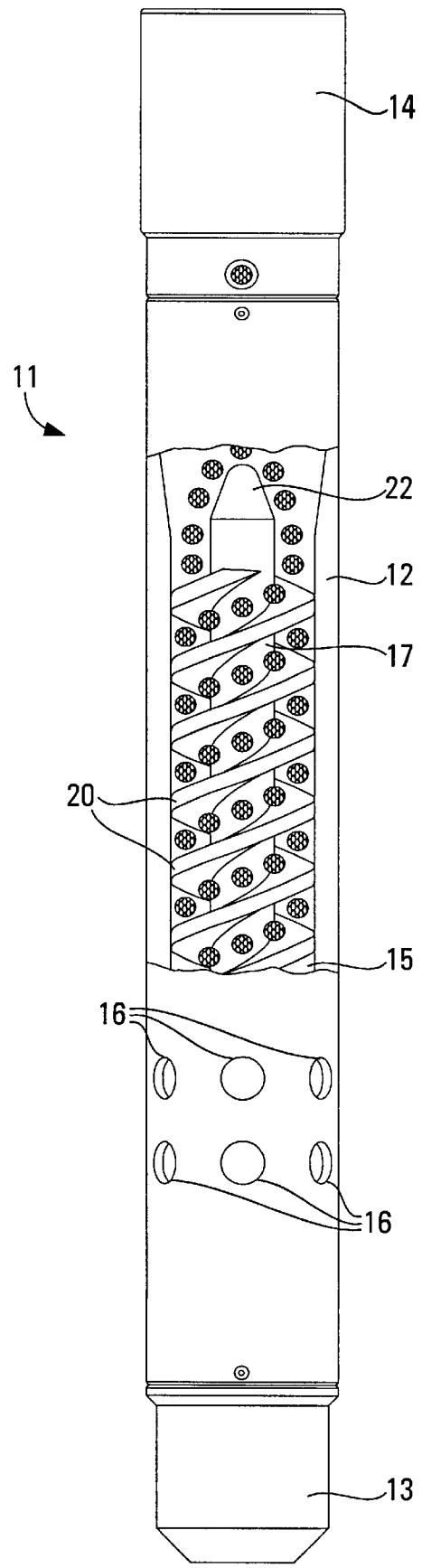
FIG. 1 is a side elevation of the separator partially sectioned.

The separator 11 shown in FIG. 1 comprises a tubular housing 12 closed at one end by a bottom sub 13 and attached at its upper end to a top sub 14. Within the tubular housing 12 is an axially extending cylindrical chamber 15 the lower end of which communicates to the outside through a series of inlet ports 16.

Extending axially within the chamber 15 is a rod-like spindle 17 the lower end 18 of which is received in a socket 19 to which it is non-rotatably connected. Above the inlet ports 16, i.e. downstream in the direction of flow, the spindle 17 is formed as an auger having two helical flights 20 extending around the spindle and defining with the wall of the chamber 15 a helical flow path.

The upper end of the spindle 17 tapers to a rounded point 22 and in the same region the thickness of the tubular housing is gradually tapered defining between the upper end of the flights 20 and the underside of the top sub 14 an expansion chamber 23. The top sub defines around periphery thereof a number of axially directed through passages 24 leading from the expansion chamber 23 to a screwthreaded socket recess 25 on the upper side of the sub 14. Opening from the central region of the chamber 23 the sub defines an exit passage 26 having an axially extending portion 27 leading to a radial part 28 that opens to the exterior of the sub 14.

Figure 3:
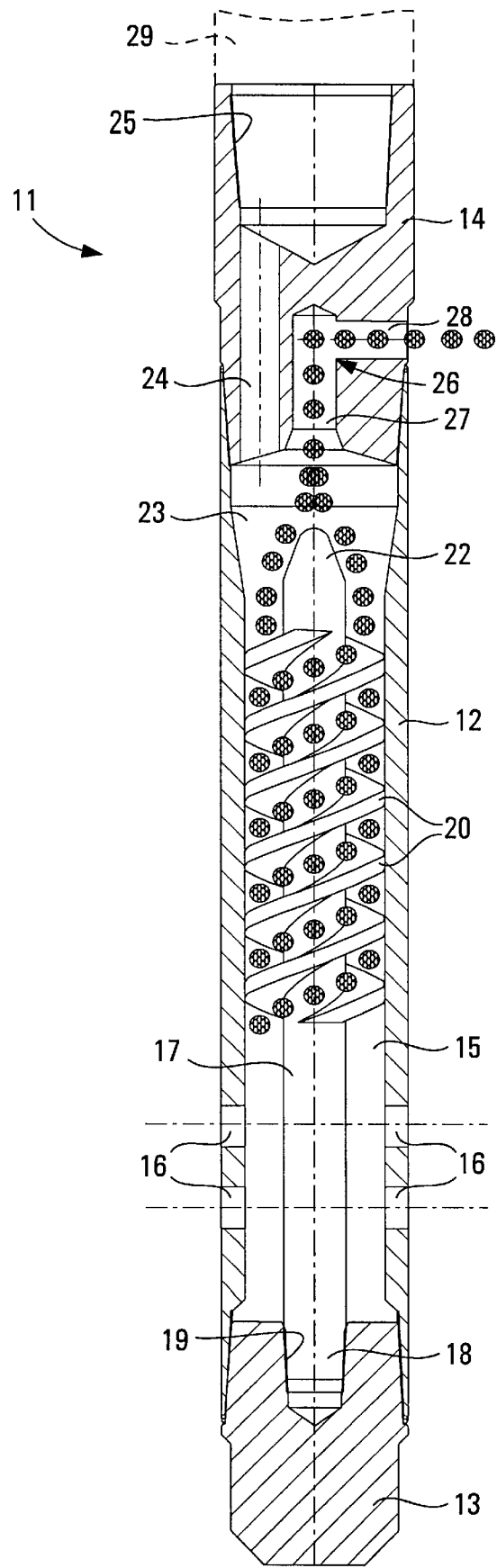
FIG. 3 shows the separator of FIG. 2 in operation.

In operation, the separator is attached in coaxial fashion via the sub 14 to the lower end of a progressing cavity pump 29 which is shown schematically in broken lines in FIG. 3, and the pump and separator are lowered in a well bore from which it is desired to extract liquids present in the surrounding formation (not shown), typically oil or a mixture of oil and water. The liquid usually will contain dissolved gases such as carbon dioxide and hydrogen sulphide, and will enter the chamber 15 under the formation pressure through the inlet ports 16. When the pump 29 is operated, the reduction in pressure as a result of the pump suction will cause some of the dissolved gas to come out of solution. The gas liquid mixture is drawn upwardly within the tubular housing 12, and upon encountering the helical flights 20 is guided thereby to move upwardly in a helical path as indicated by the series of small circular figures which are representative of the gas that is dissolved in the liquid. The centrifugal forces created in the liquid as a result of the helical flow act to reduce the gas content of the peripherally outer region of the flow and increase the gas content of the central region of the flow.

The angular momentum created in the liquid flow by the flights 20 is maintained as the liquid moves upwardly into the expansion chamber 23. In this chamber the cross-sectional area of the flow passage is expanded as a result of the termination of the flights 20, the tapering and termination of the spindle 17, and the outwards flare of the inner wall of the tubular housing 12, the combined effects of these resulting in a marked reduction in pressure of the liquid flow thus enhancing the gas separation effect. The centrifugal force in the rotating liquid is effective to confine the separated gas to the axial region of the chamber as indicated by the bubbles in FIG. 3 which rise above the rounded top end 22 of the spindle. The separated gases flow through the axial exit passage 26 to the exterior of the sub 14 where they can be released into the well bore, or if desired delivered to the surface through a separate conduit (not shown).

Figure 4:
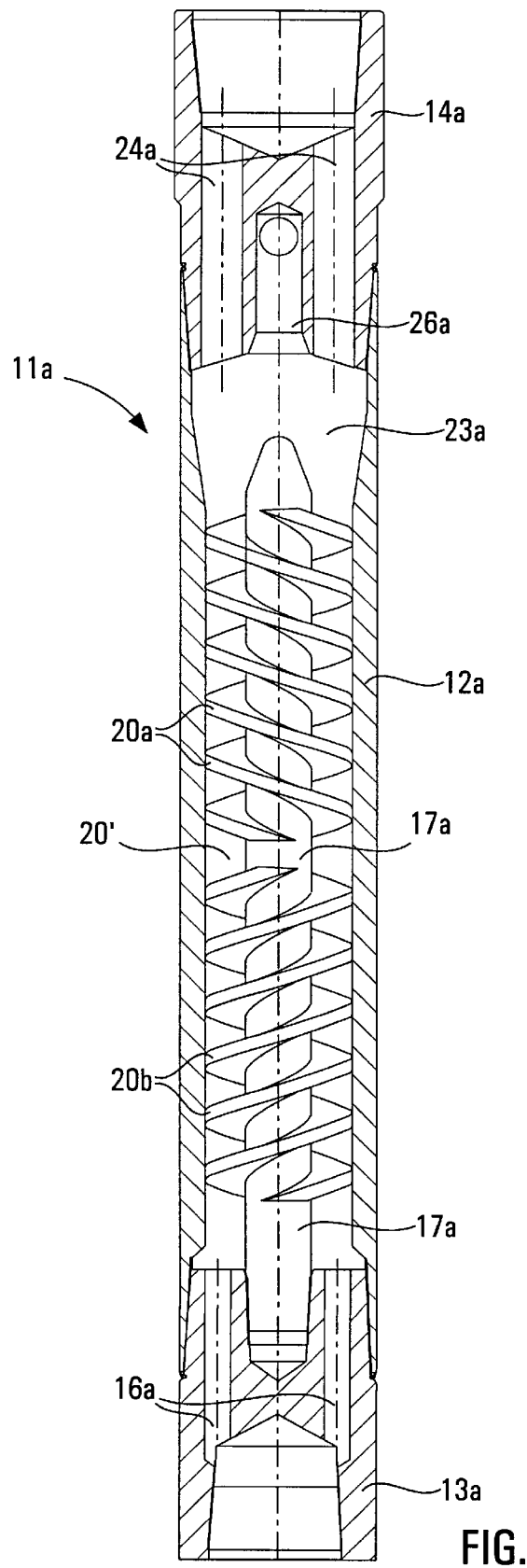
FIG. 4 shows a modified separator.

FIG. 4 shows a slightly different separator 11a designed for use with heavy oil. Referring to FIG. 4, the inlet ports 16a are formed as axial passages in the bottom sub 13. Furthermore, the spindle 17a within the tubular housing 12a is elongated, and has upper helical flights 20a and lower helical flights 20b which are separated by a central gap 20' surrounding a region of the spindle where there are no flights. It will be observed that the flights 20a are of opposite hand to the flights 20b, and the effect of this will be discussed in the following. Above the spindle 17a the expansion chamber 23a is similar to that shown in FIG. 2 (although in a sectional plane displaced by 90° with respect to FIG. 2) and the top sub 14a contains peripheral exit passages 24a for liquid and a central passage 26a for gas.

In operation, a liquid containing gas passes upwards through the inlet ports 16a and when it encounters the lower flights 20b is constrained to move in a helical path upwardly. The centrifugal force developed as a result of this helical flow tends to separate gas bubbles towards the spindle 17a. In the region of the gap 20' the rotating liquid flow leaves the upper end of the flights 20b. However the upper flights 20a are of opposite hands so that the liquid flow cannot continue upwardly with the direction of rotation imparted by the lower flights 20b, but rather must have its angular momentum dissipated before it can enter the helical passages formed by the flights 20a wherein it rotates in the opposite direction. This energy dissipation that occurs in the gap 20' applies a shear effect on the liquid and thus enhances the separation of gas bubbles towards the spindle. It will be appreciated that in the absence of such turbulence and shear effect satisfactory gas separation in viscous liquids such as heavy oils cannot be effected.

Figure 2:
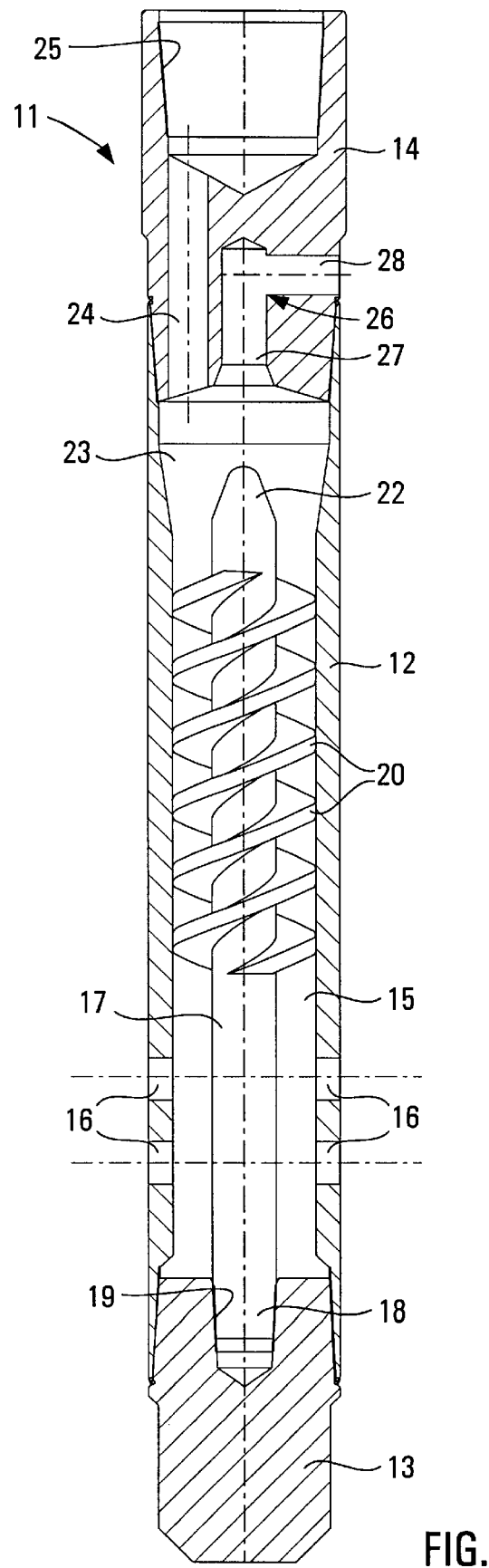
FIG. 2 is a longitudinal sectional view of the separator of FIG. 1.
Figure 5:
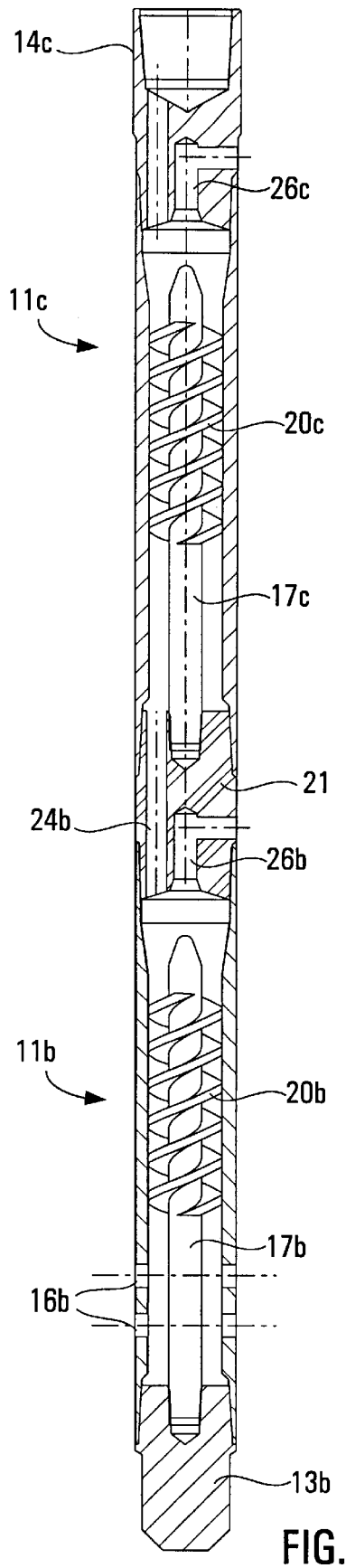
FIG. 5 shows a two-stage separator.

FIG. 5 shows a two-stage or tandem configuration for the separator comprising a lower separator 11b and an upper separator 11c, the two being joined axially by a connector sub 21 configured with peripheral axially extending liquid passages 24b and a central L-shaped gas passage 26b, the lower and upper sections 11b and 11c having respective spindles 17b and 17c with helical flights 20b and 20c, and the top sub 14c being similar to the top sub 14 as seen in FIG. 2. Inlet ports 16b are located above the bottom sub 13b.

It will be appreciated that the tandem separator shown in FIG. 5 provides a two-stage gas separation, gas separated from the liquid in the lower separator 11b being removed through the passage 23b, and gas removed in the upper stage 11c being removed through the passage 26c.

The separators described above can conveniently be designed to operate in conjunction with any progressing cavity pumps which are widely employed in the oil industry.

In test situations the separator as described above in relation to FIGS. 1 to 4 has proved to be highly effective.

For example, in one producing oil well, before installation produced gas was hammering into the production tank whereas after installation of the separator only minor bubbles of produced gas appeared in the production tank. The separator removed 15 to 20 cubic meters of gas per day, and a decrease in pump wear is anticipated.

In a second test the separator was installed in an oil well which previously had used a KUDU 300–1200 pump which operated at 48% efficiency. The well produced approximately 115 cubic meters of gas per cubic meter of oil.

After installation of the separator it was possible to reduce the pump size to a KUDU 200–1200 which operated at 92% efficiency and which reduced the gas content per cubic meter of the recovered oil to 18.5 cubic meters.

In a third well the production was at a rate of 3 cubic meters of oil per day at a pumping efficiency of 20%. After installation of the separator the well produced 12.8 cubic meters of oil per day and the same pump operated at 87% efficiency.

I claim:

1. A method for downhole separation of gas from a liquid/gas mixture produced from a sub-surface formation in a well bore, said method comprising:

drawing a flow of said mixture from said formation into a separator located in said well bore and advancing said flow in said separator in an annular path with sufficient angular momentum to effect at least partial separation of said flow into a central liquid-depleted gaseous portion and a peripheral gas-depleted liquid portion;

passing said mixture from said annular path into an expansion chamber at reduced pressure to enhance said separation; and drawing off said liquid portion.

2. A method as claimed in claim 1 comprising the further step of delivering said drawn off liquid portion to a pump and pumping it to a ground surface location, said pump also effecting said drawing off of said mixture from the formation and movement of said mixture through said separator.

3. A method as claimed in claim 2 wherein said pumping step is performed by a progressing cavity pump.

4. A method as claimed in claim 1 including providing turbulence in the flow of said mixture to apply shear forces thereto to enhance separation of gas from said mixture.

5. A method as claimed in claim 3 including providing turbulence in the flow of said mixture to apply shear forces thereto to enhance separation of gas from said mixture.

6. Apparatus for separating liquid from a liquid-gas mixture drawn from a sub-surface formation in a well bore, said apparatus comprising:

a housing that defines therein an elongate annular separation chamber;

an inlet in said housing to admit said liquid-gas mixture to said chamber;

guides in said chamber to constrain said liquid-gas mixture entering said chamber to flow in an annular path along said chamber to an exit end whereby centrifugal forces created by said flow act to separate said mixture into a gas-depleted outer portion and a liquid-depleted central portion;

an expansion chamber in communication with said separation chamber at the downstream end of said path, said expansion chamber acting to assist creation of said liquid depleted central portion; and separate liquid and gas outlet ports at said exit end to receive said gas-depleted and liquid-depleted portions respectively.

7. Apparatus as claimed in claim 6 wherein said guides define a helical annular flow path.

8. Apparatus as claimed in claim 6 wherein said housing comprises a hollow cylindrical member having a coaxial auger positioned therein, said auger having a central axial spindle surrounded by helical flights which constitute said guides, said flights and spindle terminating at an axial spacing from said outlet ports.

9. Apparatus as claimed in claim 6 including turbulence inducing means in said separation chamber to impart turbulence to the flow of said liquid gas mixture to create shear forces to enhance separation of gas therefrom.

10. Apparatus as claimed in claim 8 wherein said helical flights define two sections which are axially separated by a gap, the flights of one said section being of opposite hand to the flights of the other said section such that the direction of rotation of said flow entering said gap is reversed therein to enable said flow to enter said second section of flights.

11. Apparatus as claimed in claim 6 in combination with a pump connected to draw liquid from said liquid outlet port and deliver said liquid to a ground surface location.

12. Apparatus as claimed in claim 6 wherein said housing comprises a hollow cylindrical member having a coaxial auger positioned therein, said auger having a central axial spindle surrounded by helical flights which constitute said guides, said flights and spindle terminating at an axial spacing from said outlet ports.

13. Apparatus as claimed in claim 12 including turbulence inducing means in said chamber to impart turbulence to the flow of said liquid gas mixture to create shear forces to enhance separation of gas therefrom.

14. Apparatus as claimed in claim 12 wherein said helical flights define two sections which are axially separated by a gap, the flights of one said section being of opposite hand to the flights of the other said section such that the direction of rotation of said flow entering said gap is reversed therein to enable said flow to enter said second section of flights.

15. Apparatus for producing a gas-depleted portion from a liquid gas mixture emanating from a sub-surface formation in a well bore comprising:

apparatus as claimed in claim 6 in combination with a pump axially aligned with said housing and connected thereto, said liquid outlet port being coupled to deliver the gas-depleted portion to said pump.

16. Apparatus as claimed in claim 15 wherein said pump is a progressing cavity pump.

17. Apparatus for producing a gas-depleted portion from a liquid gas mixture emanating from a sub-surface formation in a well bore comprising:

apparatus as claimed in claim 9 in combination with a pump axially aligned with said housing and connected thereto, said liquid outlet port being coupled to deliver the gas-depleted portion to said pump.

* * * * *

UNITED STATES PATENT AND TRADEMARK OFFICE
CERTIFICATE OF CORRECTION

PATENT NO. : 5,902,378

DATED : May 11, 1999

INVENTOR(S) : Marcel Obrejanu

It is certified that error appears in the above-identified patent and that said Letters Patent is hereby corrected as shown below:

On the title page: Item [54] and Col. 1, line 3, the title should read --CONTINUOUS FLOW DOWNHOLE GAS SEPARATOR FOR PROGRESSING CAVITY PUMPS--

Signed and Sealed this

Ninth Day of November, 1999

Q. TODD DICKINSON

*Attest:*

*Attesting Officer*         *Acting Commissioner of Patents and Trademarks*